(12) United States Patent
Lai et al.

(10) Patent No.: US 10,321,761 B1
(45) Date of Patent: Jun. 18, 2019

(54) COLUMN WITH BUTT-JOINING AND ENGAGING STRUCTURE

(71) Applicant: Shenter Enterprise Co., Ltd., Chang-Hua Hsien (TW)

(72) Inventors: Ming-Hsiao Lai, Chang-Hua Hsien (TW); Kuo-Shu Huang, Changhua (TW)

(73) Assignee: SHENTER ENTERPRISE CO., LTD., Chang-Hua Hsien (TW)

( * ) Notice: Subject to any disclaimer, the term of this patent is extended or adjusted under 35 U.S.C. 154(b) by 0 days.

(21) Appl. No.: 16/030,424

(22) Filed: Jul. 9, 2018

(51) Int. Cl.
| | |
|---|---|
| *A47B 47/02* | (2006.01) |
| *A47B 87/02* | (2006.01) |
| *A47B 95/00* | (2006.01) |
| *A47B 96/14* | (2006.01) |

(52) U.S. Cl.
CPC ............ *A47B 95/00* (2013.01); *A47B 47/021* (2013.01); *A47B 87/02* (2013.01); *A47B 87/0207* (2013.01); *A47B 87/0215* (2013.01); *A47B 87/0223* (2013.01); *A47B 96/145* (2013.01); *A47B 96/1433* (2013.01); *A47B 96/1466* (2013.01); *A47B 2087/023* (2013.01); *A47B 2220/00* (2013.01)

(58) Field of Classification Search
CPC . A47B 95/00; A47B 96/1433; A47B 96/1466; A47B 2220/00; A47B 47/021; A47B 47/00; A47B 2230/14; A47B 2230/16; A47B 47/0083; A47B 47/02; A47B 47/0091; A47B 87/00; A47B 87/02; A47B 87/005; A47B 87/007; A47B 87/0207; A47B 87/0276; A47B 2096/1491; A47B 87/0284; A47B 87/0292; A47B 87/0215; A47B 2087/023; A47B 87/0223; A47B 96/1475; A47B 96/1483; A47B 96/14; A47B 96/1416; A47B 96/145; A47B 96/1458; A47F 5/10; Y10T 403/55; Y10T 403/559; Y10T 403/556; Y10T 403/7005; Y10T 403/7037
USPC ...... 211/188, 194, 182, 191, 126.11, 126.12; 403/292, 298, 296, 348, 360
See application file for complete search history.

(56) References Cited

U.S. PATENT DOCUMENTS

| | | | | |
|---|---|---|---|---|
| 1,633,798 | A * | 6/1927 | Taylor | F16L 21/002 285/330 |
| 2,086,009 | A * | 7/1937 | Walker | A47B 96/1458 248/188 |
| 2,298,516 | A * | 10/1942 | Albrecht | H01P 1/045 174/210 |
| 2,748,954 | A * | 6/1956 | Murren | A47B 87/02 108/190 |

(Continued)

*Primary Examiner* — Jennifer E. Novosad
(74) *Attorney, Agent, or Firm* — Egbert Law Offices, PLLC

(57) ABSTRACT

A butt-joining and engaging structure that allows to a pair of columns to be connected. The butt-joining and engaging structure has a seat body with a first connecting portion and a through hole, a stop part extends from an inner wall of the through hole toward the center of the through hole, a connecting member has a pair of ends defining a plug-in portion and a second connecting portion, and a position limiting part protrudes from the abutment surface of the connecting member. The first connecting portion is adapted to be affixed to one of the pair of columns. The second connecting portion is adapted to be secured to an end of the other column.

9 Claims, 11 Drawing Sheets

(56) References Cited

U.S. PATENT DOCUMENTS

| | | | | |
|---|---|---|---|---|
| 3,318,621 A * | 5/1967 | Hawley | B22D 41/18 | 403/296 |
| RE27,200 E * | 10/1971 | Ferninand et al. | A47B 96/14 | 108/107 |
| 3,765,541 A * | 10/1973 | Madey | A47B 47/00 | 211/182 |
| 3,851,601 A * | 12/1974 | Davis | A47B 87/0215 | 108/158.11 |
| 3,876,316 A * | 4/1975 | Sandovist | E04B 1/2403 | 403/44 |
| 3,972,638 A * | 8/1976 | Vivoli | E04B 2/76 | 403/174 |
| 4,021,128 A * | 5/1977 | Chiames | A47B 87/0223 | 403/217 |
| 4,158,336 A * | 6/1979 | Brescia | A47B 87/0215 | 108/156 |
| 4,998,023 A * | 3/1991 | Kitts | A47B 31/00 | 211/188 |
| 5,059,057 A * | 10/1991 | Graef | A61F 2/28 | 403/292 |
| 5,334,101 A * | 8/1994 | McDermott | A63D 15/08 | 403/296 |
| 5,683,004 A * | 11/1997 | Aho | F16M 11/24 | 108/106 |
| 5,743,670 A * | 4/1998 | Ader | E04B 1/6137 | 403/11 |
| 5,964,360 A * | 10/1999 | Hwang | A47B 87/0215 | 211/186 |
| 6,047,838 A * | 4/2000 | Rindoks | A47B 96/145 | 211/187 |
| 6,123,035 A * | 9/2000 | Pfister | A47B 87/0223 | 108/147.13 |
| 6,216,894 B1 * | 4/2001 | Hendricks | A47B 63/00 | 211/194 |
| 6,247,414 B1 * | 6/2001 | Sikora | A47B 87/0223 | 108/147.13 |
| 6,692,180 B2 * | 2/2004 | Wu | F21V 17/04 | 403/166 |
| 6,726,395 B2 * | 4/2004 | Yu | F16B 7/182 | 403/296 |
| 6,745,909 B1 * | 6/2004 | Lai | A47G 25/0664 | 211/204 |
| 2002/0131819 A1 * | 9/2002 | Kress | B23B 31/1107 | 403/292 |
| 2006/0086684 A1 * | 4/2006 | Wu | A47B 96/145 | 211/192 |
| 2006/0138066 A1 * | 6/2006 | Hung | A47B 47/005 | 211/189 |
| 2008/0116156 A1 * | 5/2008 | Park | A47B 87/0207 | 211/59.2 |
| 2012/0125870 A1 * | 5/2012 | Decroos | A47F 5/10 | 211/26 |
| 2013/0140252 A1 * | 6/2013 | Murakami | H05K 7/18 | 211/26 |
| 2016/0010675 A1 * | 1/2016 | Chu | F16B 12/32 | 403/296 |
| 2016/0095430 A1 * | 4/2016 | Moyer | A47B 47/0091 | 312/265.4 |
| 2016/0157605 A1 * | 6/2016 | Grad | A47B 47/0083 | 108/189 |

* cited by examiner

COLUMN WITH BUTT-JOINING AND ENGAGING STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a combined type column, and more particularly to an innovative structure of combined type column which has a butt-joining and engaging structure.

2. Description of Related Art Including Information Disclosed Under 37 CFR 1.97 and 37 CFR 1.98

Rack products are very common in daily life and are used for placing and storing various items such as daily necessities, books, tools, etc. to facilitate access and make the surrounding more tidy and beautiful.

At present, the rack products on the market are quite diverse, and are usually assembled from supporting columns, frames, and laminates. However, the actual use experience of such a rack structure type still reveals the following problems. The components of the conventional rack are usually fixed by screws, so that such a combination method not only leads to a more complex assembly/disassembly process, but also takes a lot of assembly time. Furthermore, if the components of the conventional rack are fixed by welding, then the supporting columns, frames, and laminates can no longer be adjusted and replaced. It is difficult to meet the different needs of consumers, and there is a need for improvement.

BRIEF SUMMARY OF THE INVENTION

The main purpose of present invention is to provide a combined type column having a butt-joining and engaging structure to connect the two columns through the butt-joining and engaging structure. The butt-joining and engaging structure comprises: a seat body extended from its top end to form a first connecting portion, the seat body is extended toward the first connecting portion to from a through hole, and the first connecting portion is fixed to one end of the column; the seat body has a plate body for covering the end face of the column; a stop part extending from the inner wall of the through hole toward the center of the through hole; a connecting member with two ends respectively defining a plug-in portion and a second connecting portion; the plug-in portion in compliance with the shape of the through hole to form a rod body structure, and the plug-in portion has an abutment surface and is selectively inserted into the through hole; the second connecting portion is used to be secured to one end of the other column; and a position limiting part protruded from the abutment surface of the connecting member. During the process of plug-in portion inserted into the through hole, the position limiting part may go beyond the stop part. Then, after the connecting member is rotated relative to the seat body by a predetermined angle θ, the abutment surface of the connecting member abuts against the side end of the stop part, and at the same time, the position limiting part is aligned with the stop part in an overlapped clamping state, so that the stop part blocks the position limiting part, making the connecting member and the seat body be in a locked state so as to firmly connect the two columns.

With the main effects and advantages of the present invention, the installation or detachment of the two columns can be performed easily and quickly, and the use of any hand tool is not required to help save time and achieve convenience. Furthermore, the cross sections of the plug-in portion and the position limiting part correspond to the shape of the accommodating space defined by the through hole and the stop part. This can be particularly practical and progressive to realize the fool proof mechanism when the connecting member correspondingly inserts into the seat body.

DETAILED DESCRIPTION OF THE INVENTION

Figure 1:
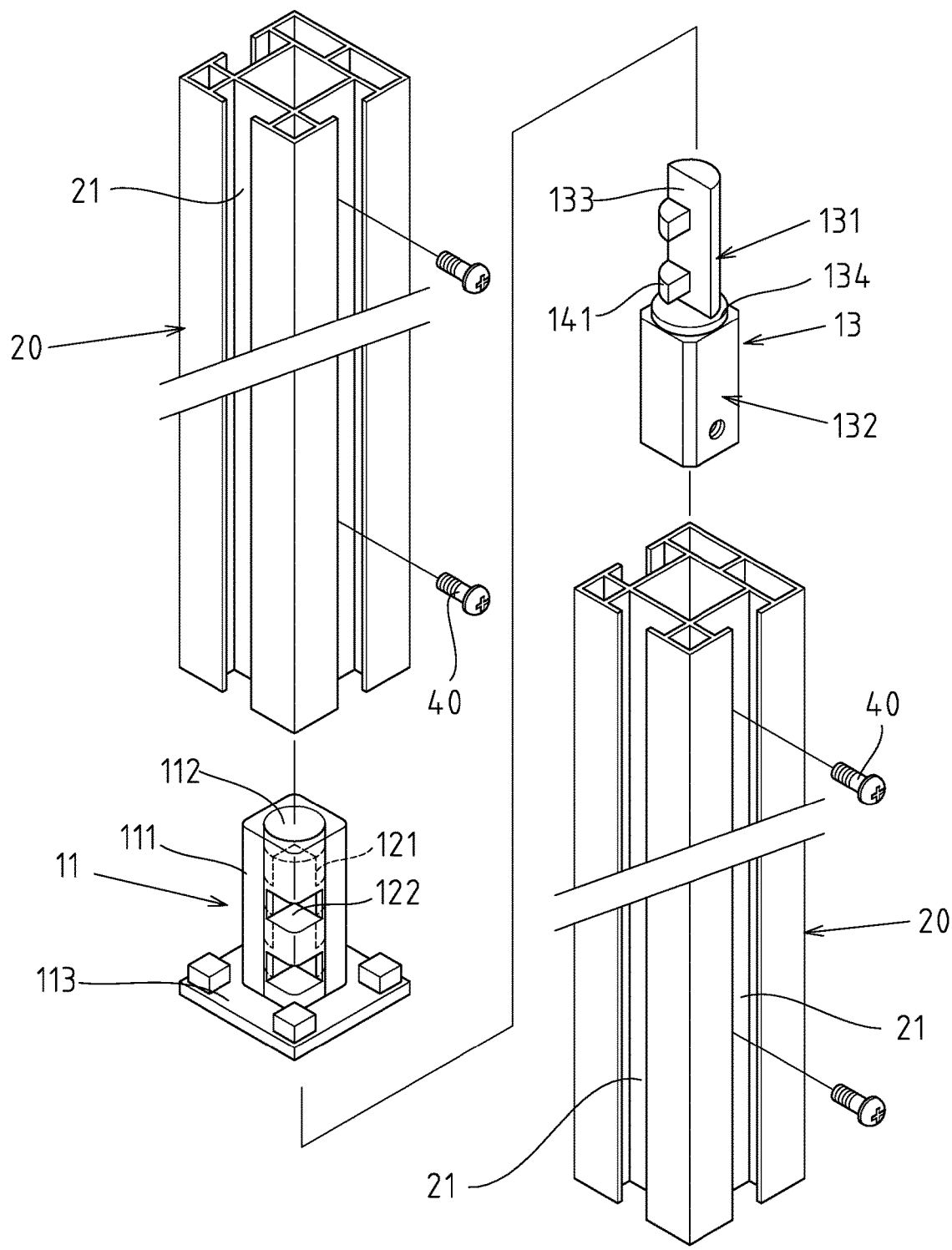
FIG. 1 is a three-dimensional exploded view of the first embodiment of the present invention.

Referring to FIGS. 1 to 4, which show the first embodiment of a column having butt-joining and engaging structure in the present invention, the embodiment is for illustrative purposes only, and is not limited by the patent application. The column with a butt-joining and engaging structure is through a butt-joining and engaging structure 10 to connect two columns 20. The butt-joining and engaging structure 10 comprises: a seat body 11 extended from its top end to form a first connecting portion 111; the seat body 11 is extended toward the first connecting portion 111 to form a through hole 112, and the first connecting portion 111 is fixed to one end of the column 20; the seat body 11 has a plate body 113 for covering the end face of the column 20; a stop part 12 extending from the inner wall of the through hole 112 toward the center of the through hole 112; a connecting member 13 with two ends respectively defining a plug-in portion 131 and a second connecting portion 132; the plug-in portion 131 in compliance with the shape of the through hole 112 to form a rod body structure, and the plug-in portion 131 has an abutment surface 133 and is selectively inserted into the through hole 112; the second connecting portion 132 is used to be secured to one end of the other column 20; and a position limiting part 14 protruded from the abutment surface 133 of the connecting member 13. During the process of plug-in portion 131 inserted into the through hole 112, the position limiting part 14 may go beyond the stop part 12. Then, after the connecting member 13 is rotated relative to the seat body 11 by a predetermined angle θ, the abutment surface 133 of the connecting member 13 abuts against the side end of the stop part 12, and at the same time, the position limiting part 14 is aligned with the stop part 12 in an overlapped clamping state, so that the stop part 12 blocks the position limiting part 14, making the connecting member 13 and the seat body 11 in a locked state to firmly connect the two columns 20. Furthermore, the outer shapes of the two columns 20 are in alignment with each other to form a continuous structure. In this embodiment, the seat body 11 and the connecting member 13 are respectively fixed to the corresponding columns 20 through the fixing member 40. In addition, at least two embedding slots 21 are provided on the side of each column 20 for the assembly of at least one cross bar on the column 20. In other embodiments, a plurality of columns 20 and a plurality of cross bars are involved to form a frame structure.

Figure 5:
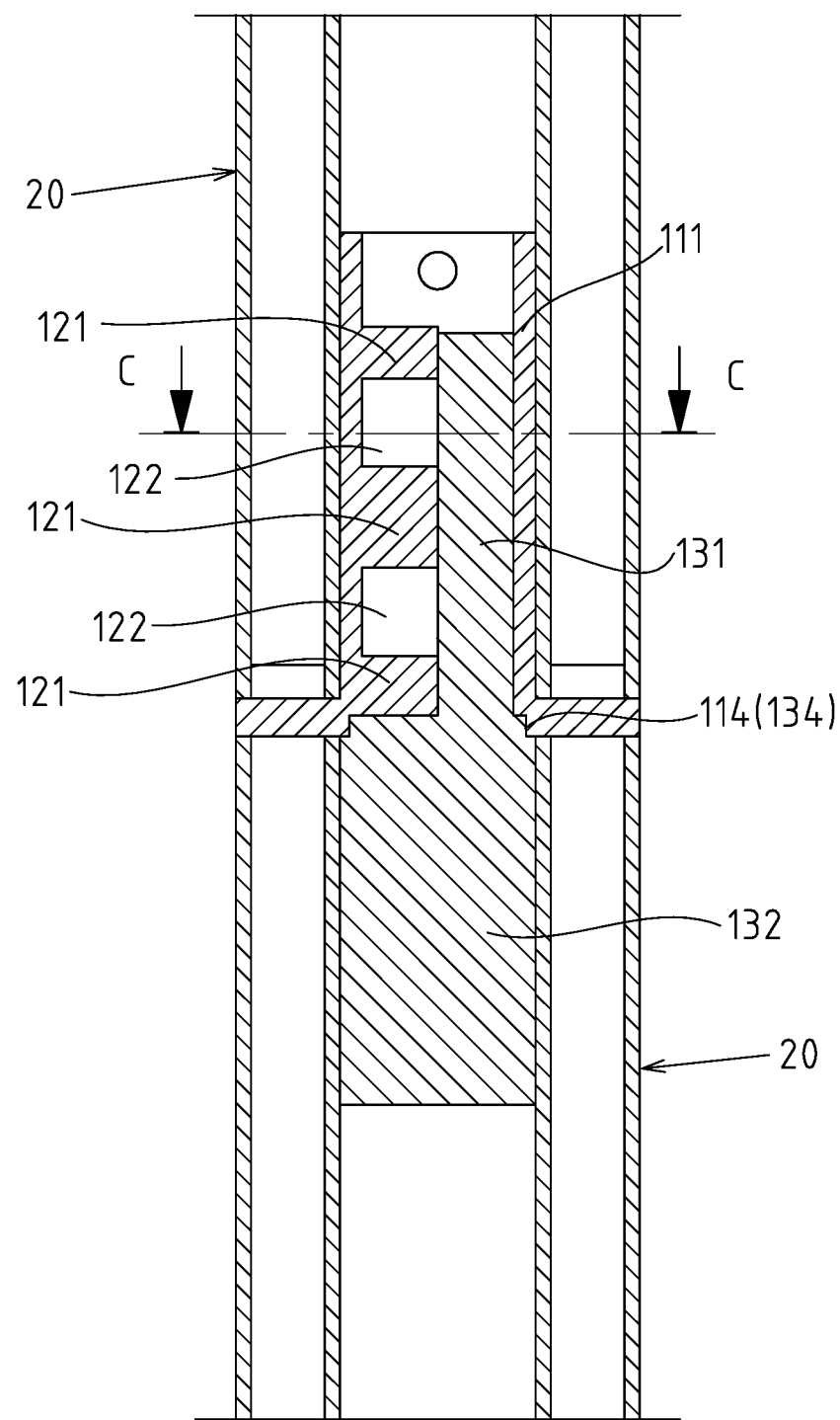
FIG. 5 is a combination sectional view of the first embodiment of the present invention.

In this embodiment, a ring wall 134 is protruded between the plug-in portion 131 of the connecting member 13 and the second connecting portion 132. Further, the through hole 112 at the terminal of the seat body 11 has an enlarged groove 114 corresponding to the shape of the ring wall 134. The ring wall 134 is selectively inserted into the enlarged groove 114 of the through hole 112 (as shown in FIG. 5), so that the connecting member 13 and the seat body 11 are in a relative rotation action.

Figure 2:
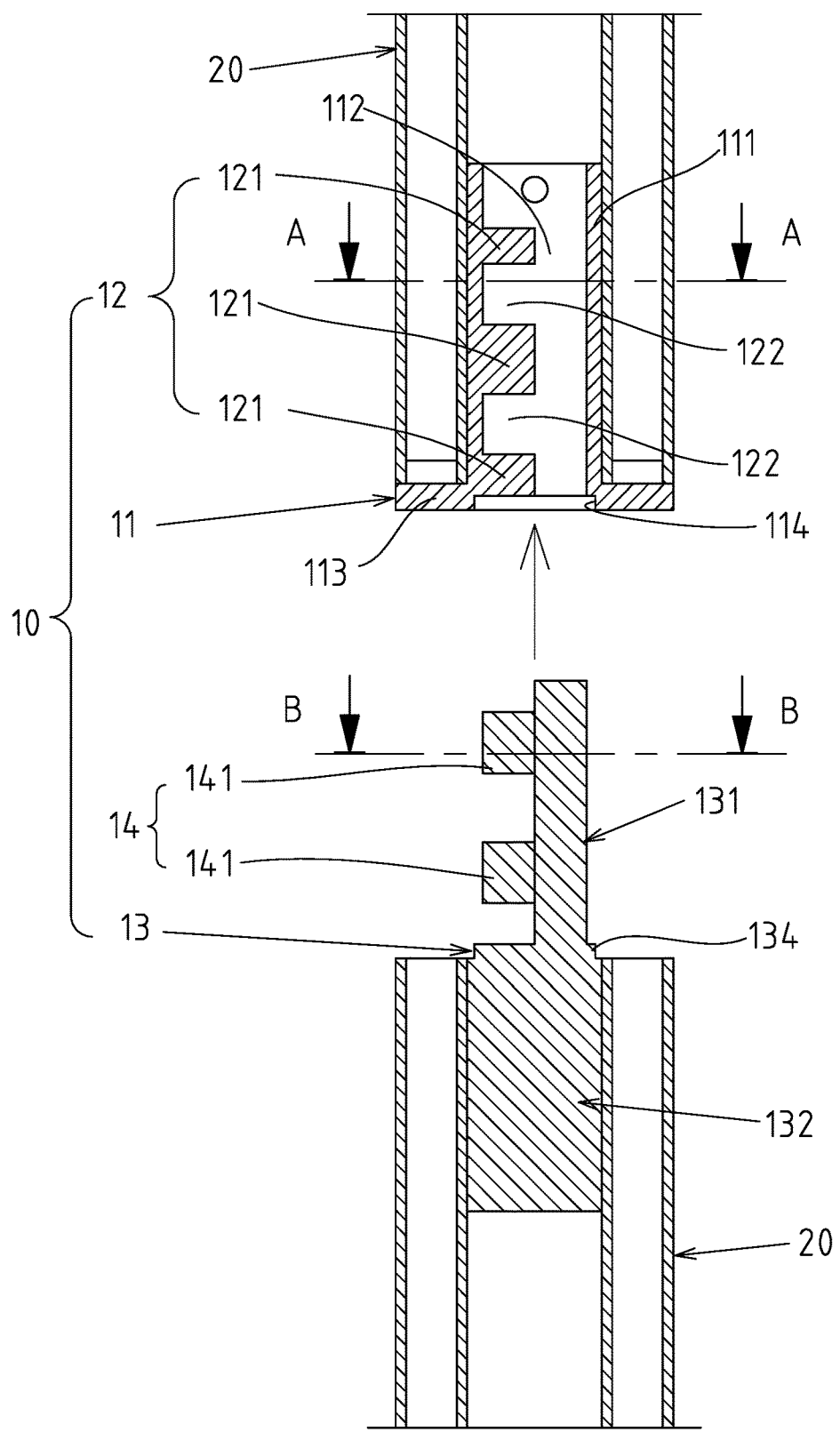
FIG. 2 is an exploded sectional view of FIG. 1.

In this embodiment, the stop part 12 has at least two stoppers 121. These stoppers 121 are longitudinally spaced on the inner wall surface of the through hole 112, and a stopping space 122 (as shown in FIG. 2) is formed between the at least two stoppers 121. Furthermore, the position limiting part 14 has at least one limiting protrusion 141, and the at least one limiting protrusion 141 is disposed on the connecting member 13 corresponding to the stopping space 122 (as shown in FIG. 5).

Figure 3:
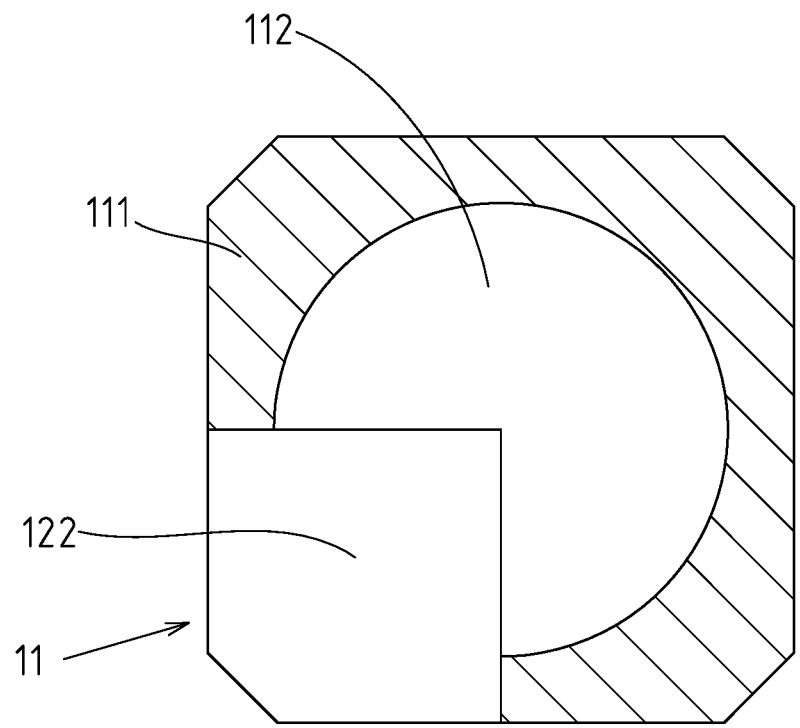
FIG. 3 is a sectional view taken along line A-A in FIG. 2.
Figure 4:
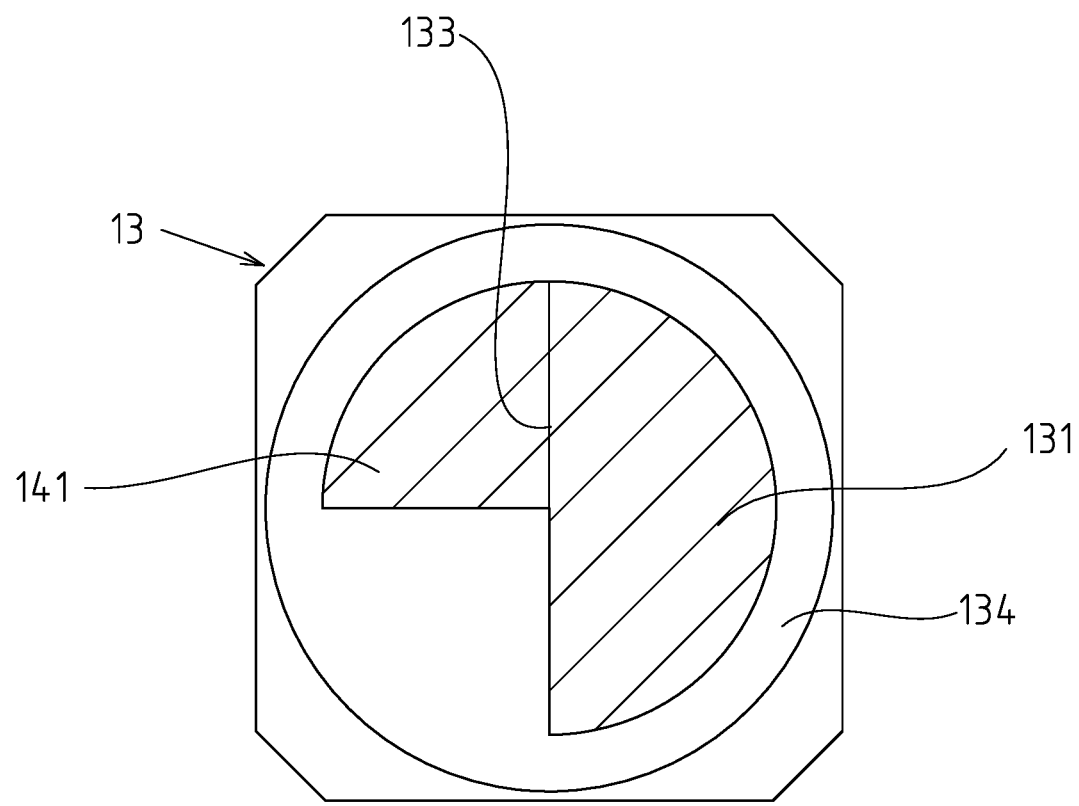
FIG. 4 is a sectional view taken along line B-B in FIG. 2.

The cross sections of the plug-in portion 131 and the position limiting part 14 correspond to the shape of the accommodating space defined by the through hole 112 and the stop part 12 for the plug-in portion 131 of the connecting member 13 correspondingly insert into the through hole 112. In this embodiment, the terminal shape of the through hole 112 defined by the through hole 112 and the stop part 12 is substantially a three-quarter circle (as shown in FIG. 3), and the cross sections of the plug-in portion 131 and the position limiting part 14 corresponding to the terminal shape of the through hole 112 is substantially a three-quarter circle (as shown in FIG. 4).

Figure 6:
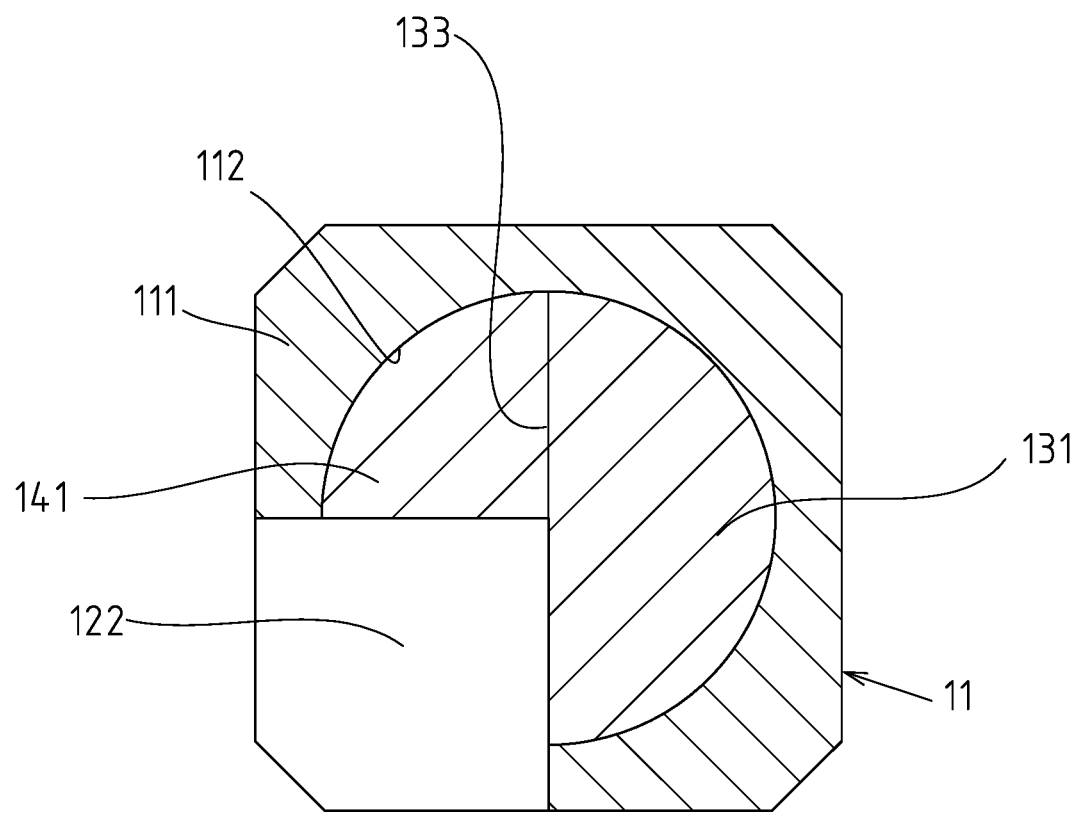
FIG. 6 is a sectional view taken along line C-C in FIG. 5.

With the above structural design, the actuation of the present invention in service is described as follows. As shown in FIG. 2, during the process of plug-in portion 131 inserting into the through hole 112, the position limiting part 14 may go beyond the stop part 12. Then, as shown in FIGS. 5 and 6, when the ring wall 134 abuts against the groove wall of the enlarged groove 114, the plug-in portion 131 is restricted from moving further into the through hole 112, and at the same time, the limiting protrusion 141 and the stopping space 122 are located at the same level.

Figure 7:
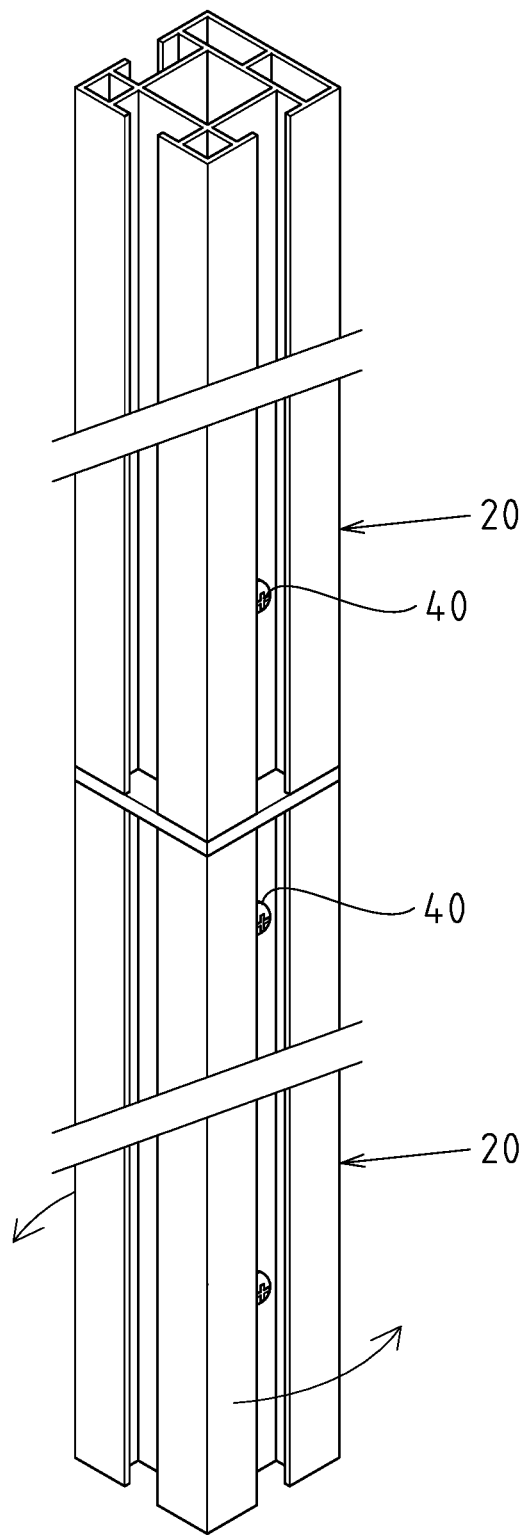
FIG. 7 is an actuation diagram of FIG. 5.
Figure 8:
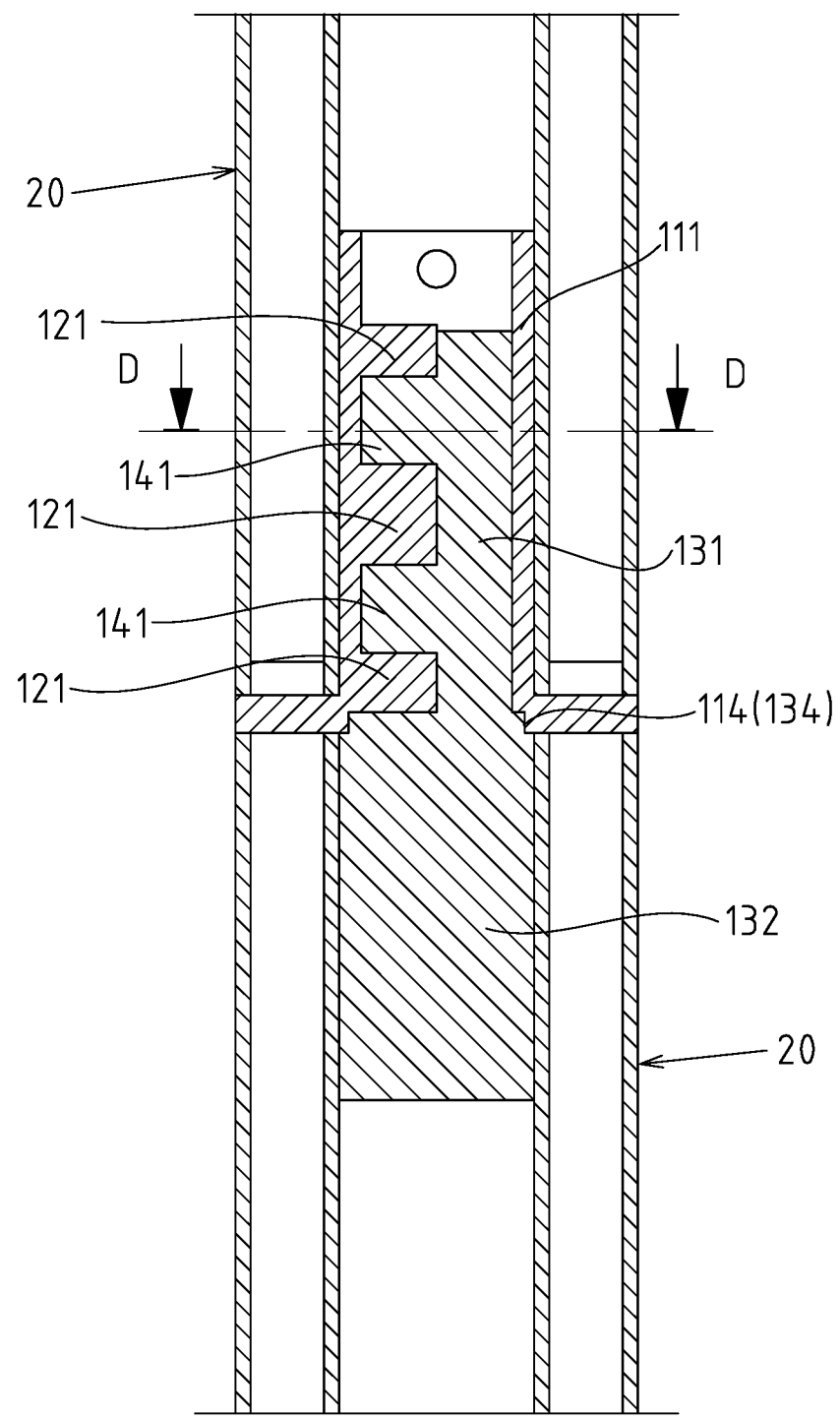
FIG. 8 is a sectional view of FIG. 7.
Figure 9:
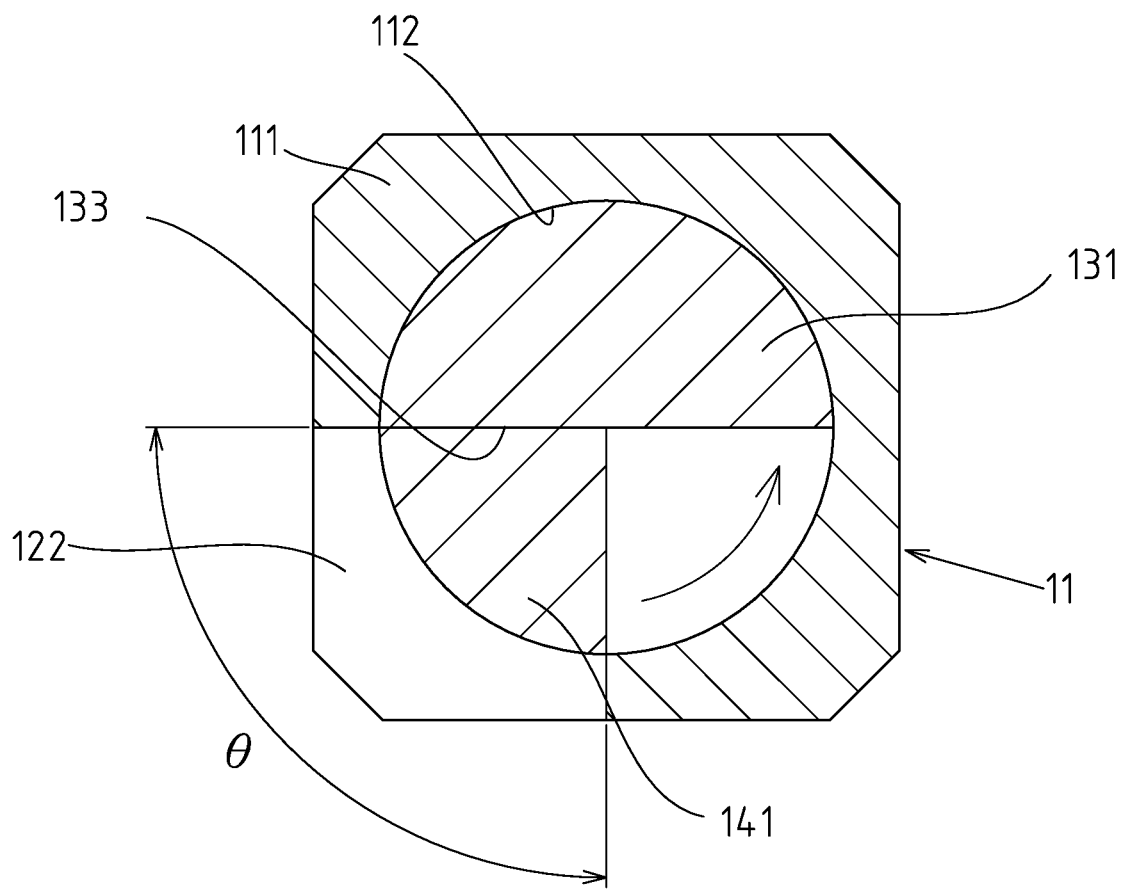
FIG. 9 is a sectional view taken along line D-D in FIG. 8.

Finally, as shown in FIGS. 7 to 9, after the connecting member 13 is rotated relative to the seat body 11 by a predetermined angle θ, the abutment surface 133 of the connecting member 13 abuts against the side end of the stop part 12, while the position limiting part 14 is aligned with the stop part 12 to form an overlapping clamping state, so that the stop part 12 blocks the position limiting part 14, that is, the limiting protrusion 141 is embedded in the stopping space 122, and these stoppers 121 correspondingly engage the limiting protrusion 141, making the connecting member 13 and the seat body 11 be in a locked state to firmly connect the two columns 20. Furthermore, the outer shapes of the two columns 20 are in alignment with each other to present a continuous structure pattern. In this embodiment, the predetermined angle θ is between 20 degrees and 120 degrees, where the preferred angle is 90 degrees.

Figure 10:
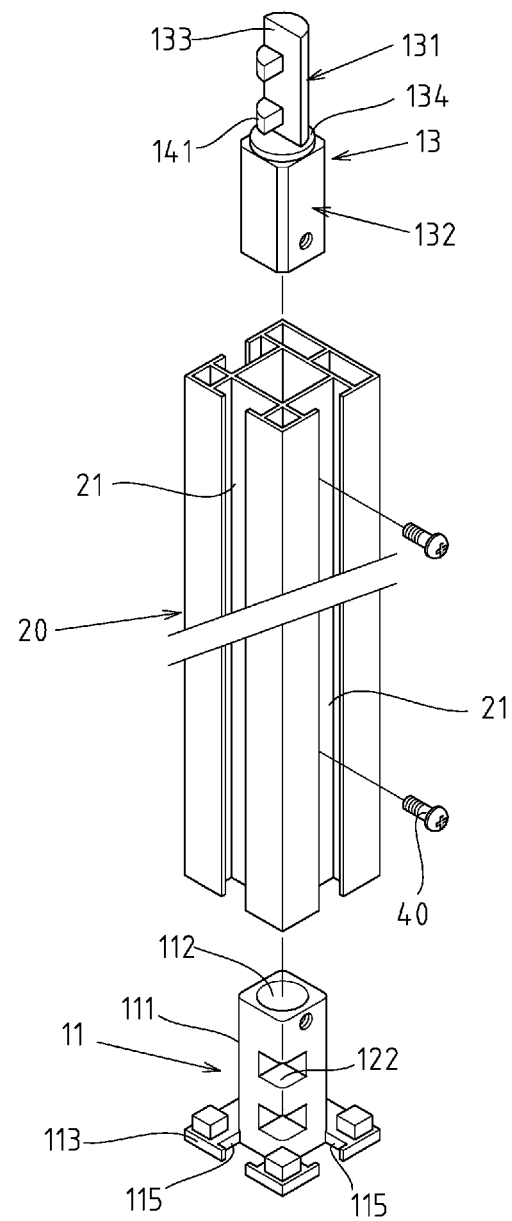
FIG. 10 is a three-dimensional exploded view of the second embodiment of the present invention.
Figure 11:
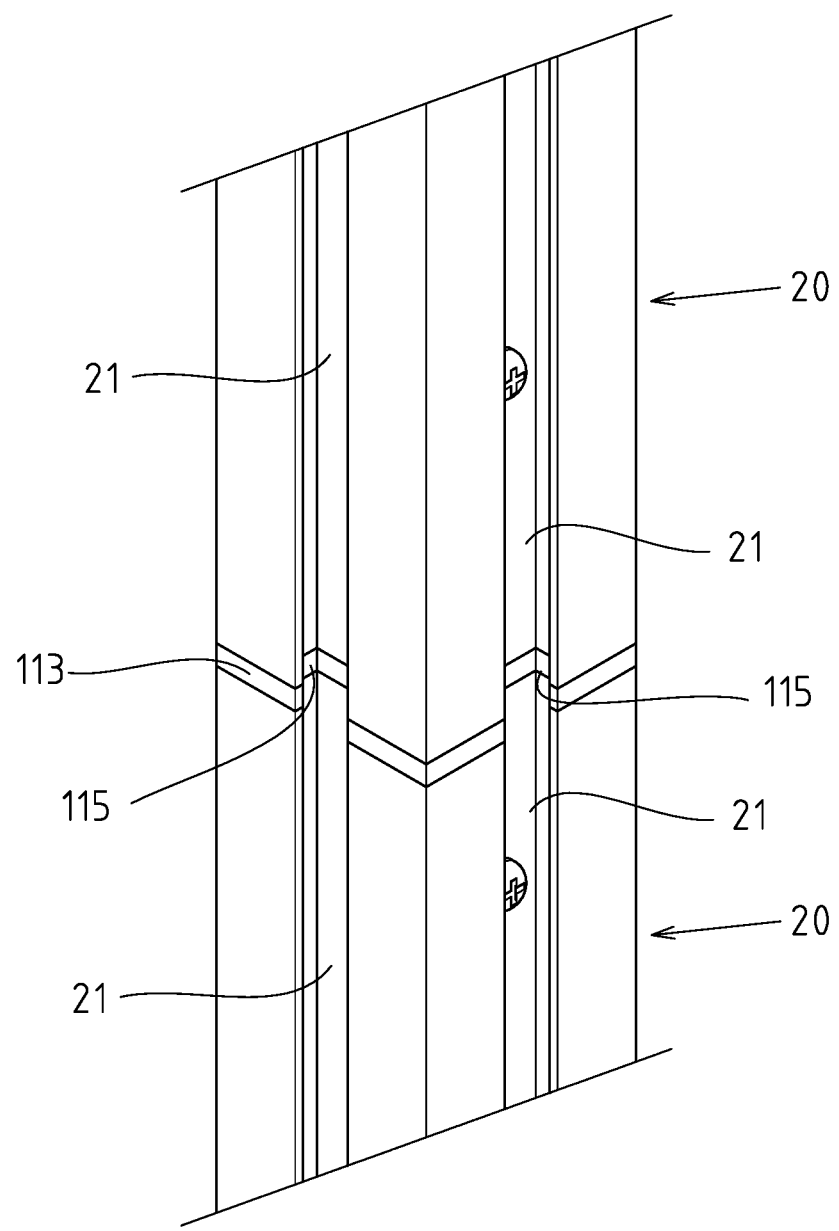
FIG. 11 is a partial three-dimensional combination diagram of FIG. 10.

As shown in FIGS. 10 and 11, which are the second embodiment, the main difference between the first embodiment and the first embodiment is that the plate body 113 corresponding to the embedding slot 21 of the column 20 is provided with at least two recesses 115. When the two columns 20 are combined together through the butt-joining and engaging structure 10, the embedding slots 21 of the two columns 20 are interconnected with corresponding recesses 115.

We claim:

1. A butt-joining and engaging structure for connecting a pair of columns, the butt-joining and engaging structure comprising:

a seat body having a first connecting portion, said seat body having a through hole formed in said first connecting portion, said first connecting portion adapted to be affixed to one end of one of the pair of columns, said seat body having a plate body affixed to said first connecting portion and adapted to cover an end face of the one of said pair of columns;

a stop part extending from an inner wall of the through hole toward a center of the through hole;

a connecting member having a pair of ends respectively defining a plug-in portion and a second connecting portion, the plug-in portion conforming to a shape of the through hole so as to form a rod body structure, the plug-in portion having an abutment surface and being selectively insertable into the through hole, the second connecting portion adapted to be secured to one end of the other of the pair of columns; and a position limiting part protruding from the abutment surface of said connecting member, a cross section of the plug-in portion and the position limiting part corresponding to a shape of an accommodating space defined by the through hole and said stop part for the plug-in portion of said connecting member, wherein, said position limiting part is extendable beyond said stop part, wherein when said connecting member is rotatable relative to said seat body by a predetermined angle θ, the abutment surface of said connecting member abuts against a side end of said stop part and said position limiting part is aligned with said stop part in an overlapped clamping state such that said stop part blocks said position limiting part so as to lock said connecting member and said seat body to firmly connect the pair of columns, wherein a ring wall protrudes between the plug-in portion of said connecting member and said second connecting portion, the through hole of said seat body having an enlarged groove corresponding to a shape of the ring wall, the ring wall being selectively insertable into the enlarged groove of the through hole such that said connecting member can rotate relative to said seat body.

2. The butt-joining and engaging structure of claim 1, wherein said stop part has at least two stoppers, the at least two stoppers being longitudinally spaced on an inner wall of the through hole, wherein a stopping space is formed between the at least two stoppers.

3. The butt-joining and engaging structure of claim 2, wherein said position limiting part has at least one limiting protrusion disposed on said connecting member corresponding to the stopping space, wherein the limiting protrusion is embedded in the stopping space to make the at least two stoppers correspondingly engage with the limiting protrusion when said connecting member is received in the through hole and rotated by the predetermined angle θ.

4. The butt-joining and engaging structure of claim 3, wherein outer shapes of the pair of columns are in mutual alignment when said connecting member is rotated relative to said seat body by the predetermined angle of θ.

5. The butt-joining and engaging structure of claim 4, wherein the predetermined angle θ is between 20 degrees and 120 degrees.

6. The butt-joining and engaging structure of claim 3, wherein said stop part is substantially a three-quarter circle, the cross section of the plug-in portion and the position limiting part being substantially a three-quarter circle.

7. The butt-joining and engaging structure of claim 6, wherein said seat body and said connecting member are adapted to be affixed to one of the pair of columns through a fixing member.

8. The butt-joining and engaging structure of claim 7, wherein at least two embedding slots are formed on a side of each column of the pair of columns, the two embedding slots receiving a cross bar.

9. The butt-joining and engaging structure of claim 8, wherein a plate body corresponding to the embedding slot of the column has at least two recesses such that the embedding slots of the pair of columns are interconnected with corresponding recesses.

* * * * *